(No Model.)

J. N. TINKLEPAUGH.
DISH CLEANER.

No. 524,621. Patented Aug. 14, 1894.

WITNESSES:
F. McArdle
C. Sedgwick

INVENTOR
J. N. Tinklepaugh
BY
Munn & Co
ATTORNEYS.

UNITED STATES PATENT OFFICE.

JACOB N. TINKLEPAUGH, OF KALKASKA, MICHIGAN.

DISH-CLEANER.

SPECIFICATION forming part of Letters Patent No. 524,621, dated August 14, 1894.

Application filed October 11, 1893. Serial No. 487,889. (No model.)

*To all whom it may concern:*

Be it known that I, JACOB N. TINKLEPAUGH, of Kalkaska, in the county of Kalkaska and State of Michigan, have invented a new and useful Improved Dish-Washing Machine, of which the following is a full, clear, and exact description.

My invention relates to improvements in dish washing devices, and has for its objects to provide a novel, simple and inexpensive dish washer, which will be convenient, speedy and effective in service, be compact in construction, and afford easy access to its parts for use and cleansing of the same.

To these ends, my invention consists in the construction and combination of parts, as is hereinafter described and claimed.

Reference is to be had to the accompanying drawings, forming a part of this specification, in which similar letters of reference indicate corresponding parts in all the figures.

Figure 2:
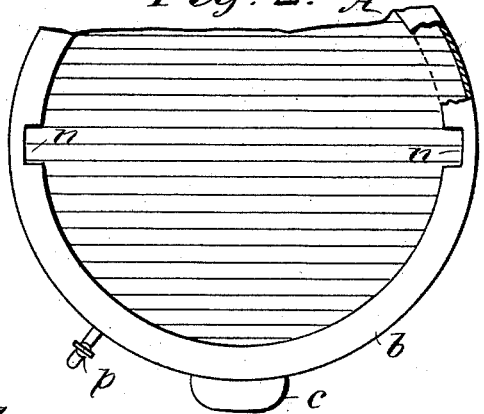
Figure 1:
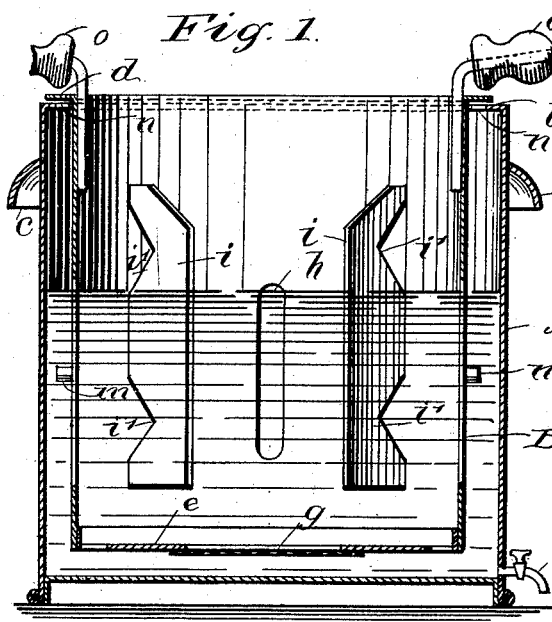
Figure 4:
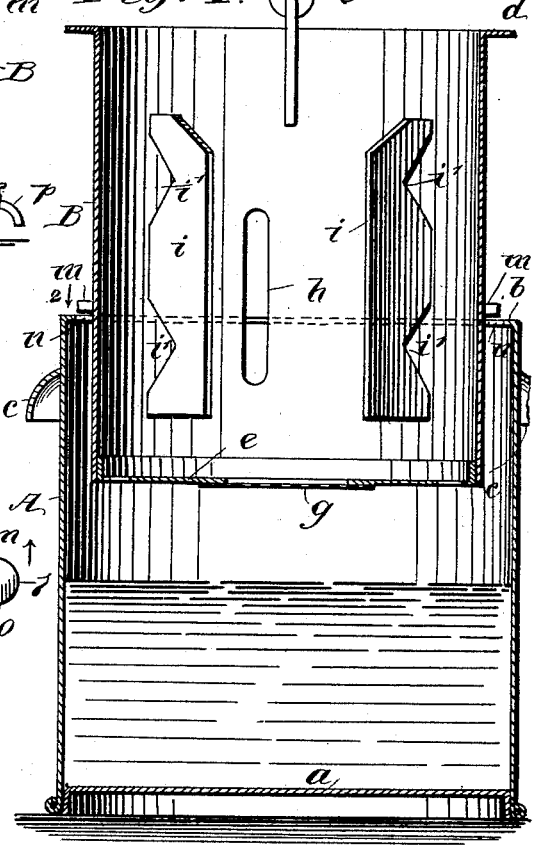
Figure 3:
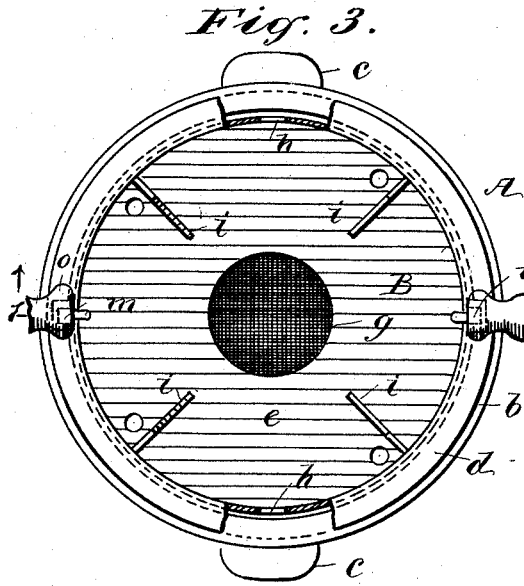

Figure 1, is a sectional side view of the device, on the line 1—1 in Fig. 3. Fig. 2, is a partial plan view of the outer vessel of the device, taken opposite the arrow 2 in Fig. 4. Fig. 3, is a plan view of the dish washer; and Fig. 4, is a sectional side view, showing the inner vessel of the device adjusted to drain water from washed dishes.

The improved dish washing apparatus, comprises two main portions A and B, which are cylindrical sheet metal vessels, that are coated to render them non-oxidizable; sheet tin or galvanized sheet iron being available material for their manufacture.

The outer vessel A, exceeds in diameter the vessel B, and has its bottom $a$, slightly raised above the lower edge of the vessel which is stiffened with wire, or by any other suitable means.

The upper edge of the outer vessel A, terminates in a flange $b$, that is inwardly extended around the edge, thus affording a circular opening at the top, of less diameter than the vessel below.

A sufficient height is given to the vessel A, to adapt it for efficient service, and opposite handles $c$, are secured upon its exterior near the top, to afford convenient means for the portage of the entire device.

The inner vessel B, is made of such a relative diameter, that it may be freely slid within the outer vessel A, through the opening bounded by the inner edge of the annular flange $b$, its height being slightly less than that of the vessel it is located within in use.

The upper edge of the vessel B, is furnished with an outwardly extending circumferential flange $d$, that will rest on the flange $b$, when the upper vessel is fully inserted within the lower one, and thus hold said upper vessel suspended, with its bottom wall suitably removed from the bottom of the vessel A, as is indicated in Fig. 1, the bottom wall $e$, of the upper vessel, having a screen $g$, of wire cloth or perforated plate, secured to it over a preferably central aperture formed in said bottom. The bottom of the vessel B, is also perforated at several points for the free entrance and escape of water, and to the same end, slots $h$, are cut in the side wall of the inner vessel.

Within the vessel B, a suitable number of wings $i$, are secured by one edge of each at proper distances apart, holes $i'$, being produced where they join the vessel, to allow water to circulate through the wings.

At opposite points two small studs $m$, are projected from the side wall of the upper vessel B, at a point nearer the bottom wall than the upper edge of the same, which studs are arranged to pass through opposite notches $n$, cut in the flange $b$, so as to permit the free insertion of the upper vessel within the lower one.

Oppositely on the inner vessel B, handles $o$, are outwardly projected from its upper edge and these afford convenient means for rotating or lifting the part they are attached to, these handles being so located that the hands of the operator will not be over the hot steam and water while rotating the inner vessel.

Near the bottom of the vessel A, a faucet $p$, is introduced through its side wall, so as to tap the vessel and be adapted to drain liquid therefrom.

In service, dishes or other small articles of table service that are to be cleansed, are introduced within the inner vessel B, and properly arranged to permit water circulation between such articles, the wings $i$, affording supports that will facilitate the proper disposition of the dishes within the vessel named. Hot soapy water is now poured over the dishes, and as the inner vessel is at this time in lowered adjustment as shown in Fig. 1, the wash water will pass from the vessel B, into the vessel A, and assume the same height in each vessel. The operator now grasps the handles o, and partly rotates the vessel B, in reverse directions, which will cause a rapid circulation of the soapy water through the interstices between the articles that are to be washed, the frictional engagement of which, together with the detergent in the water, will speedily remove grease and other material that coats the dishes, so that the latter will be in condition for rinsing after the soiled water is drained from them. The vessel B, is elevated to allow wash water to drain from it through the several openings in it, and by first raising said vessel, having arranged the studs m, opposite the notches n, so that the studs may pass through the flange b, and then partly rotating the vessel, it may be supported by said studs resting on the flange named, and left in an elevated position for a few minutes, or until the soapy wash water has drained from the articles in the vessel. The soiled wash water is now drawn off from the vessel A, through the faucet p, which is subsequently closed. Hot clean rinsing water is now poured on the articles in the vessel B, which is lowered into the position shown in Fig. 1, and rotatably moved as before mentioned, which will thoroughly cleanse the table ware, and by raising the vessel B and supporting it on the studs and flange b, as before explained, the dishes and other small ware may be rendered nearly dry, as the drained removal of the hot water leaves the dishes warm, and moisture remaining on them will be removed by subsequent evaporation, or may be wiped therefrom with a clean napkin.

It is claimed for this device, that it affords a radical improvement over the ordinary method of washing dishes, and being simple, cheap to produce, portable and compact, as well as convenient in service, it will subserve a useful purpose in a superior manner, and fill a popular want for a cheap, practical dish washing device.

Having thus fully described my invention, I claim as new and desire to secure by Letters Patent—

1. The combination in a dish washer, of an inner and an outer vessel of which the outer vessel is provided with an inwardly-projecting flange at its upper edge serving to maintain the inner vessel spaced from the outer one, the said flange having notches, and the inner vessel having openings for the inlet and outlet of water, studs on its sides, an outwardly-projecting flange at its upper edge, said flange normally resting on the inwardly-projecting flange of the outer vessel, and handles on the inner vessel, substantially as described.

2. The combination with a cylindrical outer vessel having handles on its sides, an inwardly-extending oppositely notched annular flange on the upper edge of said vessel, and a faucet at the base of said vessel, of an inner cylindrical vessel loosely fitting in the opening bounded by the annular flange, a screened and perforated bottom for the inner vessel, slots in the side wall of said vessel, spaced, vertical inwardly-extended wings on said wall, opposite studs on the inner vessel near its lower end, and arranged to slide through the notches of the annular flange and to rest on said flange, and opposite handles projected from the upper edge of the inner vessel, for its rotation, substantially as described.

JACOB N. TINKLEPAUGH.

Witnesses:
IRVING C. FRENCH.
C. S. BLOM.